WILLIAM CARR, OF LOGANSPORT, INDIANA.

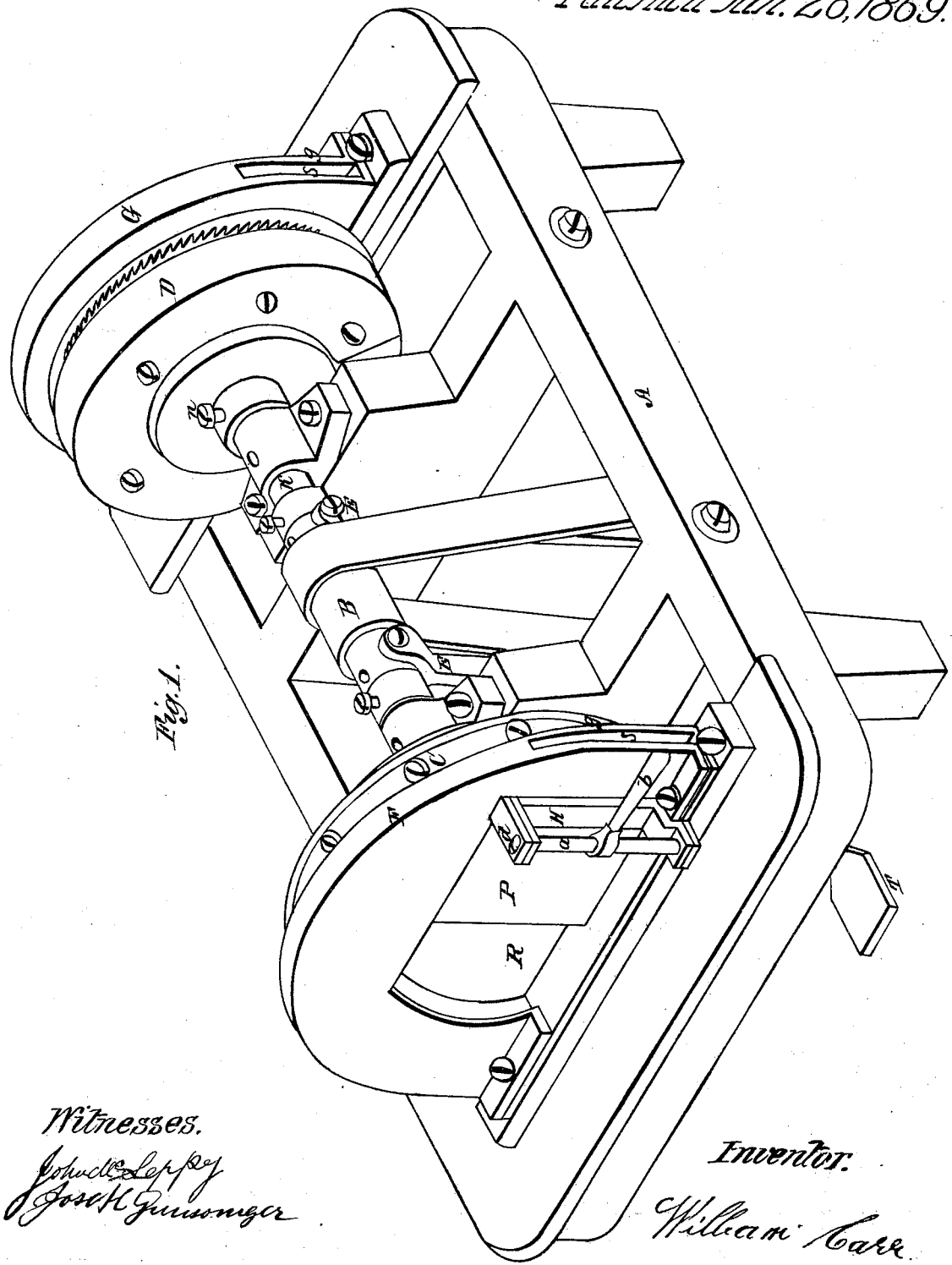

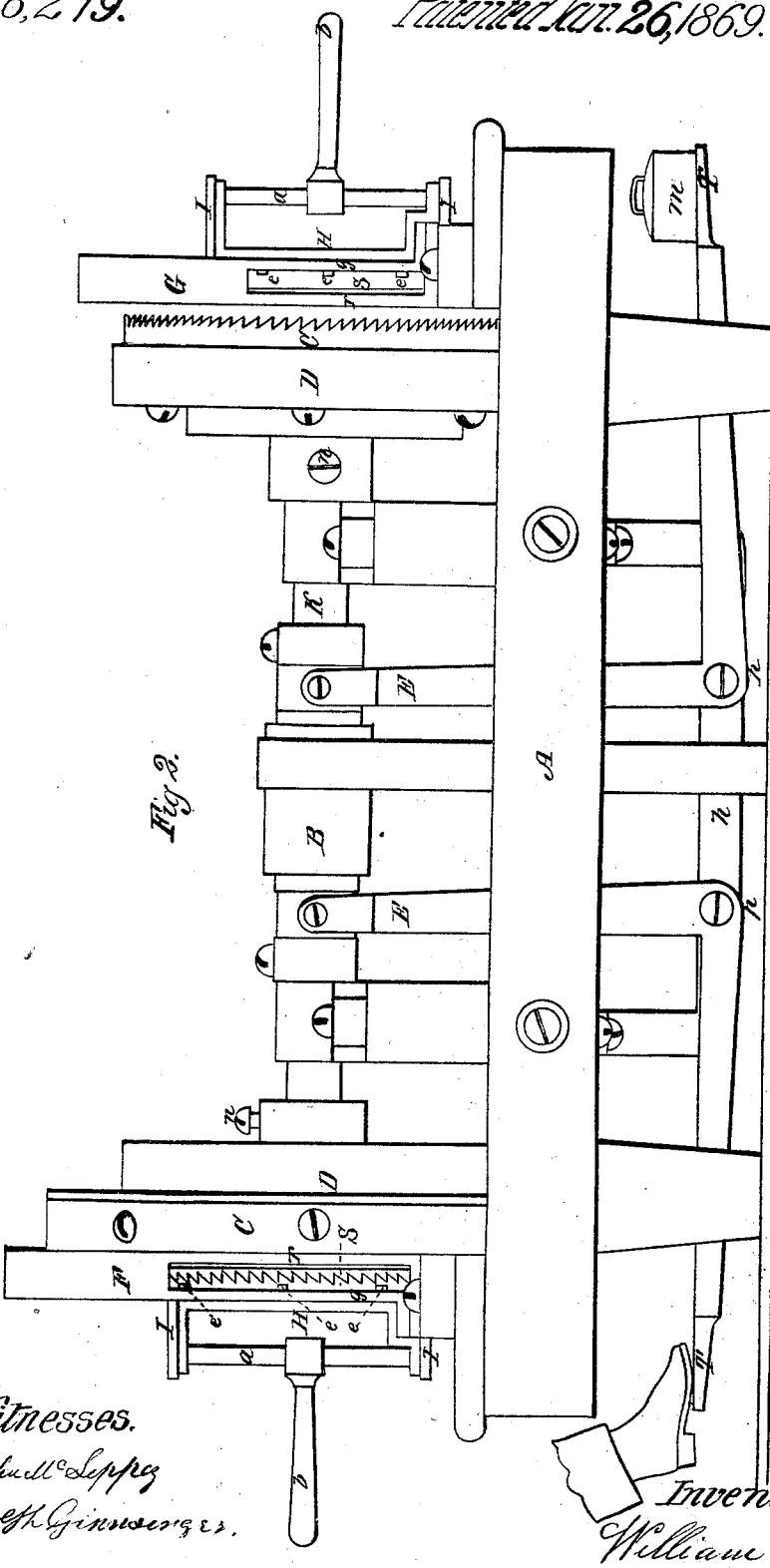

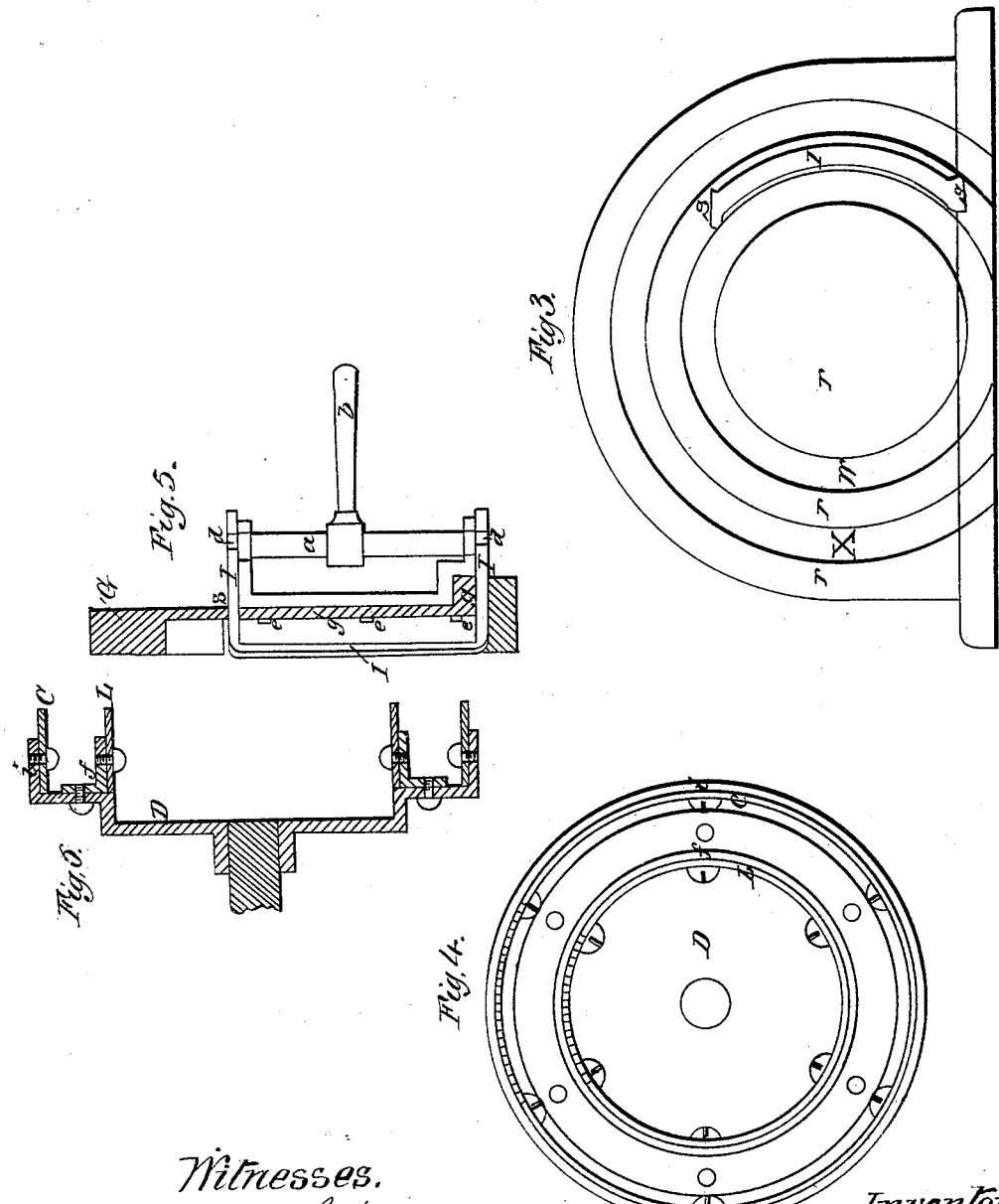

Letters Patent No. 86,279, dated January 26, 1869.

IMPROVEMENT IN FELLOE-SAWING MACHINE.

The Schedule referred to in these Letters Patent and making part of the same.

*To all whom it may concern:*

Be it known that I, WILLIAM CARR, of Logansport, in the county of Cass, and State of Indiana, have invented a new and useful Machine for Sawing Wagon-Felloes; and I do hereby declare that the following is a full, clear, and exact description of the construction and operation of the same, reference being had to the annexed drawings, making a part of this specification, in which—

Figure 1 is a perspective view.

Figure 2, a longitudinal elevation.

Figure 3, transverse section, showing the grooved chambered head G.

Figure 4, face-plate, provided with flanges $f\ i$, to which the concentric saws are secured.

Figure 5, vertical section of the chambered head G and clamp I.

Figure 6, transverse section of the face-plate, fig. 4, showing the movable flange $f$, which can be removed at pleasure, for the purpose of filing or repairing inside saws.

My invention is a device designed to saw both sides of felloes, and it consists in the combination of certain parts, as will be hereinafter more fully described.

A is the frame;

B, the pulley over which the belt passes;

K, the sliding mandrel;

E E, the stirrups connected with the treadles T T, the angles of which are secured to the hanger $h$ at $p\ p$, fig. 2.

The face-plates D D are secured to each end of the mandrel K with set-screws $n\ n$.

The face-plates are each provided with two flanges, to which the saws are secured.

The concentric saws are placed at proper distances apart to give the required depth to the felloe.

The heads F G are chambered or hollow, and provided with grooves, X W, fig. 3, to receive the saws while cutting the plank.

The rings $r\ r\ r$, figs. 3 and 5, are back of the front plates $g$, leaving a space of sufficient thickness to insert the felloe-plank between the front plate and back rings.

The opening, R, fig. 1, is made through the front plate, for the purpose of feeding the plank into the machine.

The clamp I passes through the front plate at $s\ s$, and the back part forms the segment of a circle in the middle ring, $r$, between the saw-grooves X W, making a space for the plank between the circular clamp and the pins or teeth $e\ e\ e$, which project from the front plate, as in figs. 2 and 5.

The clamp is worked by the eccentric-rod $a$, as shown in figs. 1, 2, and 5.

The weight $m$ is placed upon either treadle, to slide the mandrel back.

The use of my machine is to saw both sides of wagon-felloes, by means of two concentric saws, which are secured to each end of the sliding mandrel K, figs. 1 and 2. They are operated by the treadles T T, through the stirrups E E.

The head F is designed for the large-sized, and the head G, for the small-sized felloes.

In operating my machine, the plank P, designed to be sawed into felloes, is placed in the recess R, and slid into the chamber, toward the opening, S, fig. 1. The lever $b$ is forced around, which clamps the plank against the pins or teeth $e\ e\ e$, figs. 2 and 5, by means of the eccentric-rod $a$ acting upon the clamp I I.

The foot is then placed on the treadle T, and forces the saws through the plank. When the foot is removed, the weight $m$ slides the saws back from the plank, and the felloe falls out through the slot S.

The same operation is performed at the opposite end, by changing the weight $m$ to the opposite treadle.

I am aware of the patent granted to J. Vaughan, dated 17th November, 1857, for a felloe-sawing machine, in which two concentric saws are secured to each end of a mandrel, which can be rotated, but which is not capable of a longitudinal or sliding movement, the heads which holds the planks to be sawed being movable instead.

As these features form no part of my invention, I do not wish to claim them; but

What I claim as my invention, and desire to secure by Letters Patent, is—

1. The combination of head F or G with clamp I and concentric rod $a$, all as herein described, for the purpose set forth.

2. The longitudinal reciprocating saws L, and heads F and G, when arranged and constructed to operate as herein described.

WILLIAM CARR.

Witnesses:
JOHN McLEPPY,
JOSEPH GREMSMYER.